US 6,552,743 B1

(12) United States Patent
Rissman (10) Patent No.: US 6,552,743 B1
(45) Date of Patent: Apr. 22, 2003

(54) DIGITAL CAMERA-READY PRINTER

(75) Inventor: Paul Rissman, Palo Alto, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/057,431

(22) Filed: Apr. 8, 1998

(51) Int. Cl.[7] .............................................. H04N 5/225
(52) U.S. Cl. ................................... 348/207.2; 348/375
(58) Field of Search ............................... 348/373, 375, 348/376, 333.01, 333.05, 333.11, 333.12, 207.2, 14.02, 14.04, 231.99, 231.7, 231.9; 358/909.1, 906, 1.1, 1.6; 347/2

(56) References Cited

U.S. PATENT DOCUMENTS

| | | | |
|---|---|---|---|
| 4,074,324 A | | 2/1978 | Barrett ........................ 358/296 |
| 4,827,347 A | | 5/1989 | Bell ............................ 358/224 |
| 4,937,676 A | * | 6/1990 | Finelli et al. ................ 348/375 |
| 5,289,217 A | | 2/1994 | Rosenblatt .................... 354/76 |
| 5,493,409 A | | 2/1996 | Maeda et al. ................. 358/296 |
| 5,499,113 A | * | 3/1996 | Tsuboi et al. ................ 358/479 |
| 5,579,116 A | | 11/1996 | Sugiyama et al. ........... 358/296 |
| 5,606,420 A | * | 2/1997 | Maeda et al. ................. 358/296 |
| 5,806,993 A | * | 9/1998 | Petterutti et al. ............. 400/88 |
| 5,825,408 A | * | 10/1998 | Yuyama et al. ........... 348/14.02 |
| 6,115,137 A | * | 9/2000 | Ozawa et al. ................. 358/1.6 |
| 6,229,565 B1 | * | 5/2001 | Bobry ........................ 348/373 |
| 6,380,975 B1 | * | 4/2002 | Suzuki ........................ 348/232 |
| 2002/0196345 A1 | * | 12/2002 | No |

FOREIGN PATENT DOCUMENTS

| | | | |
|---|---|---|---|
| EP | 0689157 A2 | 12/1994 | .......... G06K/15/00 |
| EP | 0718716 A1 | 6/1996 | .......... G03G/15/01 |
| JP | 3-29471 | * 2/1991 | .......... H04N/5/225 |
| WO | WO 97/50243 | 12/1997 | ............ H04N/1/00 |
| WO | WO 98/15116 | 4/1998 | .......... H04N/5/225 |

* cited by examiner

Primary Examiner—Wendy R. Garber
Assistant Examiner—Jacqueline Wilson (57) ABSTRACT

A system and method utilize a digital camera-ready printer which can print directly from a variety of conventional digital cameras on the market. The digital camera-ready printer includes a camera interface that can link with a digital camera in different modes to transfer frames of digital image data from the digital cameras to the digital camera-ready printer. Preferably, the camera interface includes a hot shoe receptor to establish a convenient hot shoe link between the digital camera and the digital camera-ready printer. The digital camera-ready printer includes a processor that can identify the coupled digital camera in order to instruct the digital camera to transmit the frames of digital image data. The processor can also convert the format of the digital image data to a predetermined image file format. The processor of the digital camera-ready printer along with a display device allows a user to edit and manipulate an electronic image represented by a single frame of digital image data prior to printing.

21 Claims, 5 Drawing Sheets

DIGITAL CAMERA-READY PRINTER

TECHNICAL FIELD

The invention relates generally to printers and more particularly to a photo printer in an electronic imaging and printing system.

BACKGROUND ART

A digital camera captures an image of a particular subject using an imaging system that includes an optical lens and a photosensor array, such as a charged coupled device (CCD). The imaging system "captures" a set, or frame, of digital image data that represents a particular subject at the time that the frame is captured. Each frame of digital image data is typically stored in a memory of the digital camera for subsequent viewing on a display or downloading to a computer system for editing and printing. Depending on the manufacturer of the digital camera, the frames of digital image data is stored in a particular file format from a number of potential file formats, such as JPEG, TIFF, and BMP.

One of the advantages of using the digital camera over a photographic camera is that the images captured by the digital camera can be edited and manipulated by a user in various manners. Conventionally, the editing is accomplished using a host computer. The host computer receives the digital image data from the digital camera. After the digital image data is received, the host computer can display a frame of digital image data as an electronic image on a monitor. The host computer can then be utilized to edit and manipulate the electronic image using photo-manipulation software. For example, the software may allow the user to adjust color balance and luminance, to change zoom factors, to adjust the orientation, and to crop the electronic image. The host computer can also print the electronic image using a conventional general-purpose printer or a special-purpose photography printer, such as the HP PhotoSmart Photo Printer, if the printer is attached to the host computer.

Another approach to printing the digital image data is to have a printer that is directly coupled to the digital camera. U.S. Pat. No. 4,074,324 to Barrett describes an instant electronic camera that is directly connected to a mechanical scanning printer. A concern with the Barrett invention is that the electronic image captured by the instant electronic camera cannot be edited and manipulated by a user.

Similarly, U.S. Pat. No. 4,827,347 to Bell describes an electronic camera that is directly connected to a database/picture printer. The electronic camera of Bell includes many display windows on the opposite side of a lens assembly for viewing digitally captured images prior to printing or downloading. However, the concern relating to the lack of editing ability of the Barrett invention also exists with the Bell invention.

Still another approach to printing the digitally captured image is to have a printer that is incorporated into the digital camera or is attached physically to the camera housing of the digital camera. U.S. Pat. No. 4,937,676 to Finelli et al. (hereinafter Finelli) describes an electronic camera system with a detachable printer. The detachable printer of Finelli utilizes a self-developing film that is exposed according to the digital image data. Again, the Finelli system does not allow the user to edit the electronic image. In addition, the detachable printer is a dedicated printer. That is, the detachable printer of Finelli cannot be used with any other type of digital camera.

U.S. Pat. No. 5,493,409 to Maeda et al. (hereinafter Maeda) describes a still video camera having a printer. In one embodiment, the printer is incorporated into the still video camera. In this embodiment, a television set is utilized to view the digitally captured images. In another embodiment, the printer is a detachable unit. Similar to the printer of Finelli, the detachable printer unit of Maeda is a dedicated printer. Furthermore, consistent with the aforementioned prior art, both embodiments of Maeda do not have editing capabilities.

While the known systems for printing digitally captured images operate well for their intended purpose, an efficient and inexpensive system for editing and printing digitally captured images is desired. What is needed is a non-dedicated printer having editing capabilities that could function without the assistance of a host computer.

SUMMARY OF THE INVENTION

A system and method utilize a digital camera-ready printer as a stand-alone device that can print directly from any one of a variety of conventional commercially available digital cameras. The digital camera-ready printer includes a camera interface that can link with a digital camera in different modes to transfer frames of digital image data from a camera to the digital camera-ready printer.

The camera interface can include a cable port, a memory card port, and a cableless port. Using the cable port, a cable such as a serial cable can be utilized to transfer frames of digital image data from the digital camera. Alternatively, the frames of digital image data can be transferred by exchanging a detachable memory card. There are digital cameras that are equipped to store frames of digital image data in such a detachable memory card. The memory card can be inserted into the memory card port of the digital camera-ready printer in order to transfer the frames of digital image data to the digital camera-ready printer. In the preferred embodiment, the camera interface includes an infrared port to establish a cableless link between the digital camera and the digital camera-ready printer. In the most preferred embodiment, the camera interface includes a hot shoe receptor to link the digital camera-ready printer to the digital camera. A hot shoe connection allows a convenient and cost-efficient link between the digital camera-ready printer and the digital camera.

Preferably, the frames of digital image data can be transferred to an internal memory of the digital camera-ready printer without any intervention on the part of the digital camera-ready printer. However, if necessary, the digital camera-ready printer is configured to identify the coupled digital camera in order to initiate transfer of the frames of digital image data. Depending on the identification of the digital camera, the digital camera-ready printer is able to send a signal directing the digital camera to transmit the digital image data.

Contained within the digital camera-ready printer is a processor which is configured (e.g., programmed) to convert the original image file format of the digital image data into a predetermined format, for example, a JPEG. The processor also has the ability to edit and manipulate an electronic image represented by a frame of digital image data. A user interface and a display device integrated onto the digital camera-ready printer allow a user to view the electronic image and input the desired commands for editing and manipulating the electronic image. In a preferred embodiment, the display device includes a thumbnail display feature. The thumbnail display feature allows the user to view a number of electronic images, simultaneously, and facilitates a convenient means for the user to select a particular image for editing and/or printing. The editing and manipulating functions may include image cropping, image rotation, luminance alteration, zoom factor adjustment, and color adjustment. In the preferred embodiment, the display device is a liquid display device (LCD). In the most preferred embodiment, the display device is a 4 in.×4 in. (10.16 cm×10.16 cm) color LCD which provides a high resolution electronic image.

A printer driver is contained within the digital camera-ready printer to drive a printing mechanism in order to print a hard copy of the image on a recording medium. Preferably, the digital camera-ready printer utilizes color inkjet technology for the printing operation. In the preferred embodiment, the resolution of the printing mechanism is of photographic quality with 600 dots-per-inch (dpi) or greater.

The method according to the invention includes steps of capturing an image represented by a frame of digital image data and storing the digital image data in the internal memory or the detachable memory card. The steps of capturing and storing can be repeated to acquire additional images. After capturing and storing, the next step involves receiving the frame of digital image data by the digital camera-ready printer through the camera interface of the digital camera-ready printer. If necessary, the digital camera-ready printer identifies the coupled digital camera in order to instruct the digital camera to transmit the frame of digital image data. The frame of digital image data is then converted to a predetermined image file format if the file format of the image data is different from the predetermined image file format utilized by the digital camera-ready printer. Next, the frame of digital image data is displayed as an image on a display device, allowing a user to view changes as an electronic image is edited. The final step according to the method is printing the electronic image onto a recording medium.

An advantage of the present invention is that a host computer is not needed to interface between the digital camera and the digital camera-ready printer in order to edit and manipulate the electronic image. Thus, the digital camera-ready printer enables an inexpensive method to edit and print electronic images captured by the digital cameras.

Another advantage of the invention is that the absence of the host computer simplifies the printing procedures, because the user does not need to learn a sophisticated photo-manipulation program in order to view and edit the captured electronic images.

Another advantage of the present invention is that the digital camera-ready printer is not dedicated to a particular type of digital camera, so that the user has the ability to print from a variety of digital cameras on the market. That is, the printer is not manufacturer-specific.

Still another advantage of the present invention is that the digital camera-ready printer eliminates the need for a cable. An exchange of a memory card or a link utilizing the infrared, radio frequency, or the hot shoe connection allows a convenient method to transfer digital image data from a digital camera to the digital camera-ready printer.

DETAILED DESCRIPTION

Figure 1:
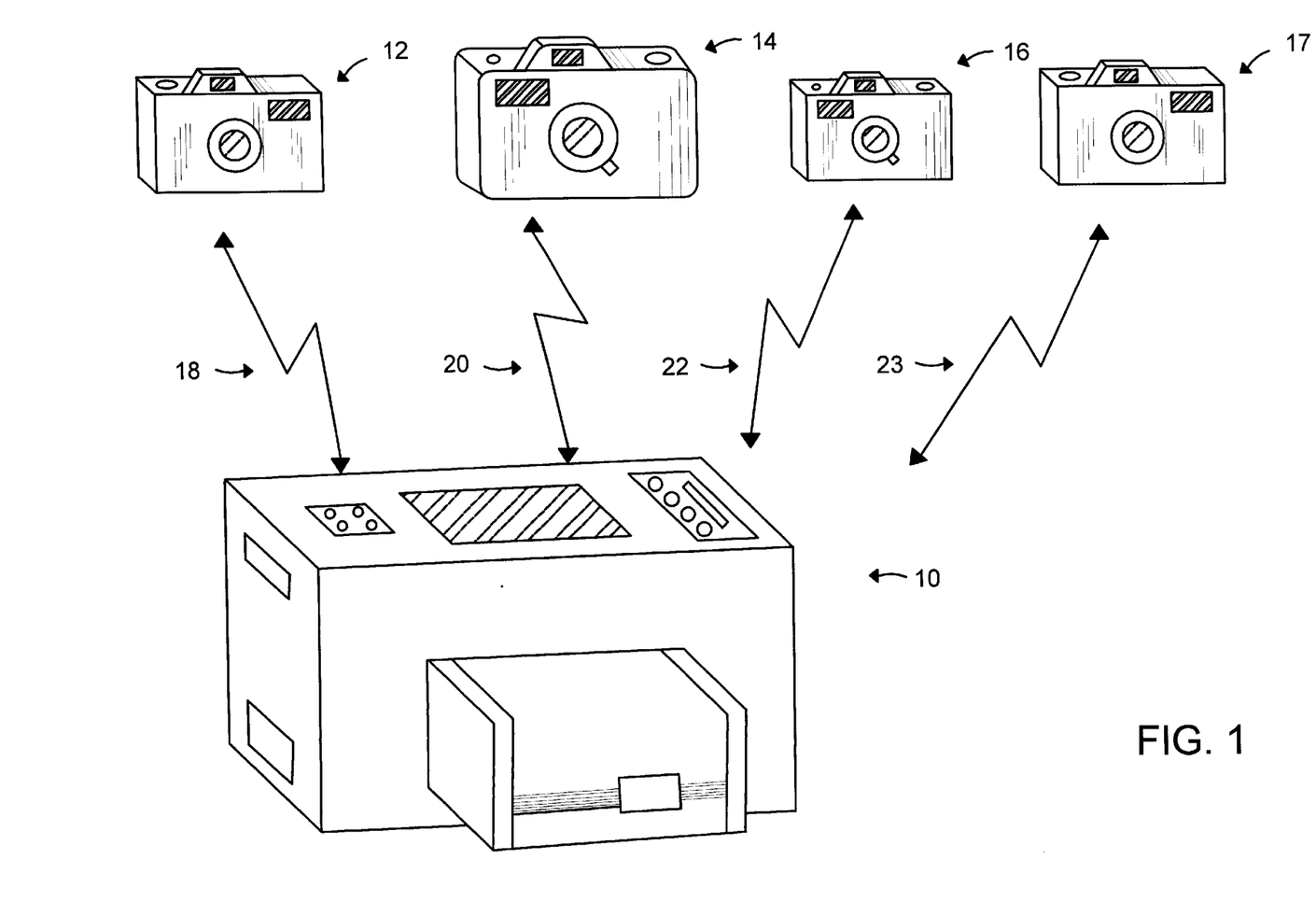
FIG. 1 is an illustration of a digital camera-ready printer having a capability of linking to one of several types of digital cameras in accordance with the present invention.

FIG. 1 illustrates a digital camera-ready printer 10 capable of linking to any or all of several commercially available digital cameras 12, 14, 16, and 17. Each of the digital cameras 12, 14, 16, and 17 represents a different type of digital camera or a digital camera from a different vendor. Although only the four types of digital cameras 12, 14, 16, and 17 are shown, the digital camera-ready printer 10 is not limited to linking with only the three types of digital cameras 12, 14, 16, and 17 shown in FIG. 1.

The digital cameras 12, 14, 16, and 17 are linked to the digital camera-ready printer 10 by communication links 18, 20, 22, and 23, respectively. The communication links 18, 20, 22, and 23 are schematic representations of the different types of links that are possible with the digital camera-ready printer 10 to transfer frames of digital image data captured by the digital cameras 12, 14, 16, or 17 to the digital camera-ready printer 10. The communication link 18 is a connection using a conventional communication cable, such as a serial cable, between the digital camera 12 and the digital camera-ready printer 10. The communication link 20 is an indirect link. The indirect link can be an exchange of a memory card (not shown) that is removable from the digital camera 14 and then inserted into the digital camera-ready printer 10. The communication link 22 represents the preferred link, a cableless link such as an infrared or a radio frequency connection, between the digital camera 16 and the digital camera-ready printer 10. Lastly, the communication link 23 represents the most preferred link between the digital camera and the digital camera-ready printer 10. The communication link 23 is a hot shoe connection.

The communication links 18, 20, 22, and 23 are means to transfer frames of digital image data from any one of the digital cameras 12, 14, 16, and 17 to the digital camera-ready printer 10. The type of link utilized by the digital camera-ready printer 10 is not crucial to the invention. Although only the four communication links 18, 20, 22, and 23 are described herein, alternative communication links are possible without deviating from the present invention.

Figure 2:
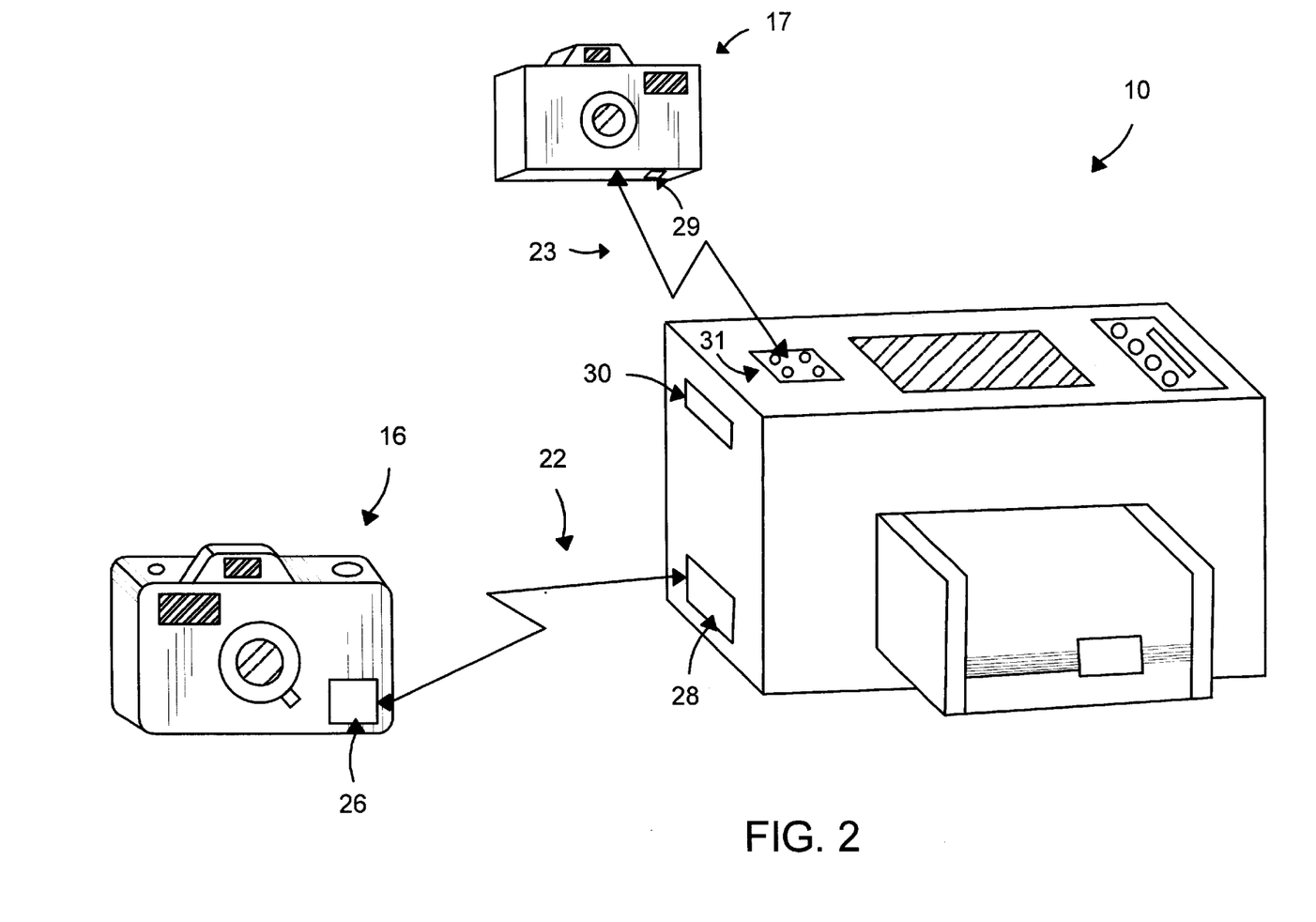
FIG. 2 is an illustration of the digital camera-ready printer and a digital camera linked by cableless connection in accordance with the present invention.

With reference to FIG. 2, the digital camera-ready printer 10 that is either linked to the digital camera 16 by the cableless communication link 22, or linked to the digital camera 17 by the hot shoe communication link 23 is shown. The communication links 22 and 23 are the same links that were discussed in reference to FIG. 1. As shown in FIG. 2, the digital camera 16 has a cableless port 26 for transmitting the digital image data by either infrared or radio frequency waves. For reception of the digital image data in the form of either infrared or radio frequency waves, the digital camera-ready printer 10 includes a cableless port 28. Also shown in FIG. 2 is a hot shoe connector 29 located on the housing of the digital camera 17. The hot shoe connector 29 includes conventional electrical contacts. A hot shoe receptor 31 on the digital camera-ready printer 10 provides the corresponding electrical contacts necessary to establish the hot shoe connection.

The cableless communication link 22 is the preferred connection to link the digital camera 16 and the digital camera-ready printer 10. However, the hot shoe communication link 23 is the most preferred connection for the digital camera-ready printer. To transfer the digital image data from the digital camera 16 to the digital camera-ready printer 10 utilizing the cableless communication link 22, a user places the digital camera 16 adjacent to the digital camera-ready printer 10 such that the cableless ports 26 and 28 are in data communication with each other. In order to utilize the hot shoe communication link 23 for the transfer, the user attaches the digital camera 17 to the digital camera-ready printer 10 such that the hot shoe connector 29 is in contact with the hot shoe receptor 31.

Unlike the communication links 18 and 20, the use of the cableless communication links 22 and 23 requires no additional components such as a cable or a memory card. Also shown in FIG. 2 is a memory card port 30. The memory card port 30 is utilized when the link involves the exchange of the memory card as discussed in reference to the communication link 20 in FIG. 1.

Figure 3:
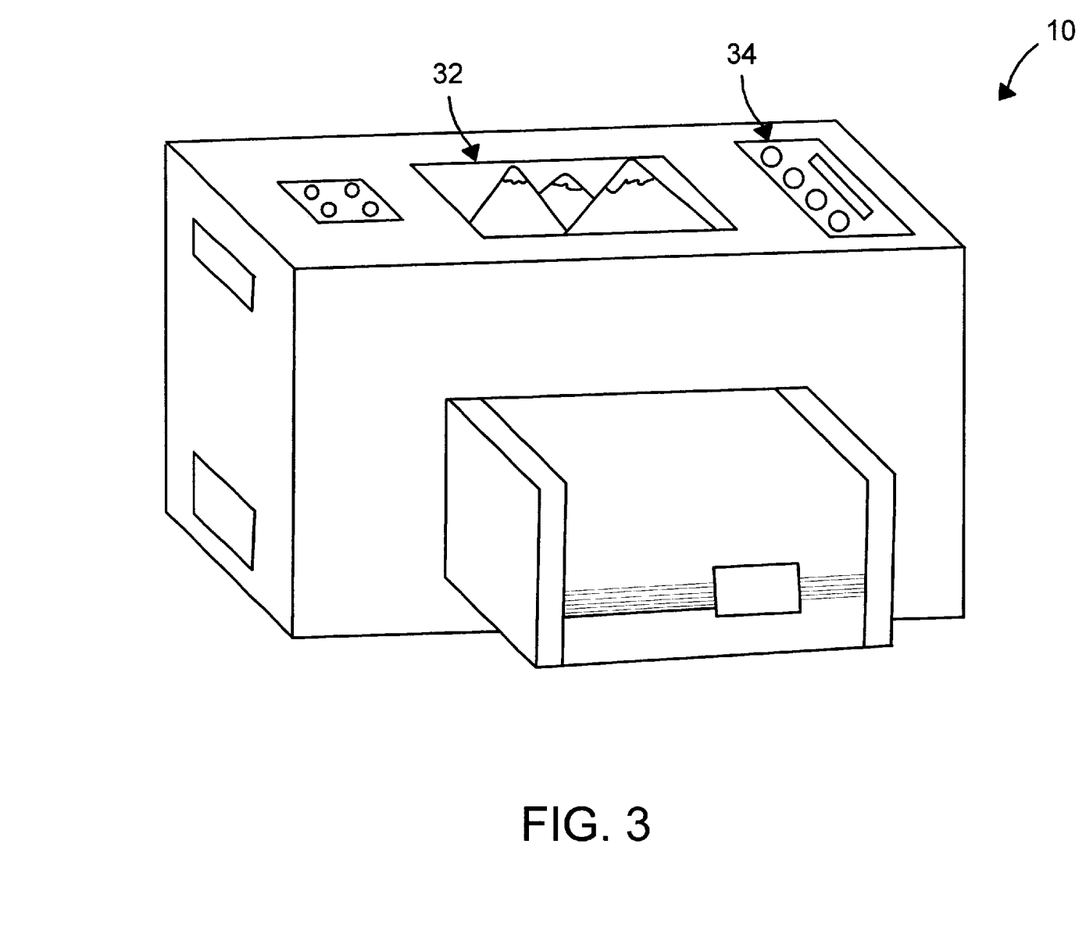
FIG. 3 is a perspective illustration of the digital camera-ready printer in accordance with the present invention.

Referring to FIG. 3, a perspective view of the digital camera-ready printer 10 is shown. Situated on the top of the digital camera-ready printer 10 is a display device 32. Preferably, the display device 32 is a 4 in.×4 in. (10.16 cm×10.16 cm) color liquid crystal display (LCD), with the resolution of the display device 32 being dependent upon the number of pixels in the display device 32. The display device 32 allows the user to view an image represented by a frame of digital image data that was transferred or downloaded into the digital camera-ready printer 10 from any one of the digital cameras 12, 14, 16, and 17 (shown in FIG. 1). Next to the display device 32 is a user interface 34. After the electronic image is visually displayed on the display device 32, the user may edit and manipulate the electronic image by utilizing the user interface 34 prior to printing.

The editing and manipulating may include adjusting the luminance, rotating the image, changing zoom factors, and cropping the electronic image. If the display device 32 in the digital camera-ready printer 10 is a color LCD, the editing and manipulating may further include adjusting the color of the electronic image.

The user interface 34 may include buttons for editing and manipulating the electronic image, as well as buttons for controlling non-editing functions of the digital camera-ready printer 10. The non-editing buttons may include an on/off button, a get image button, a receiving image button, a print button, a feed paper button, and an online button. The user interface 34 may also include various light indicators for power on, paper jam, ready for printing, printing, and other information concerning the status of the digital camera-ready printer 10.

Figure 4:
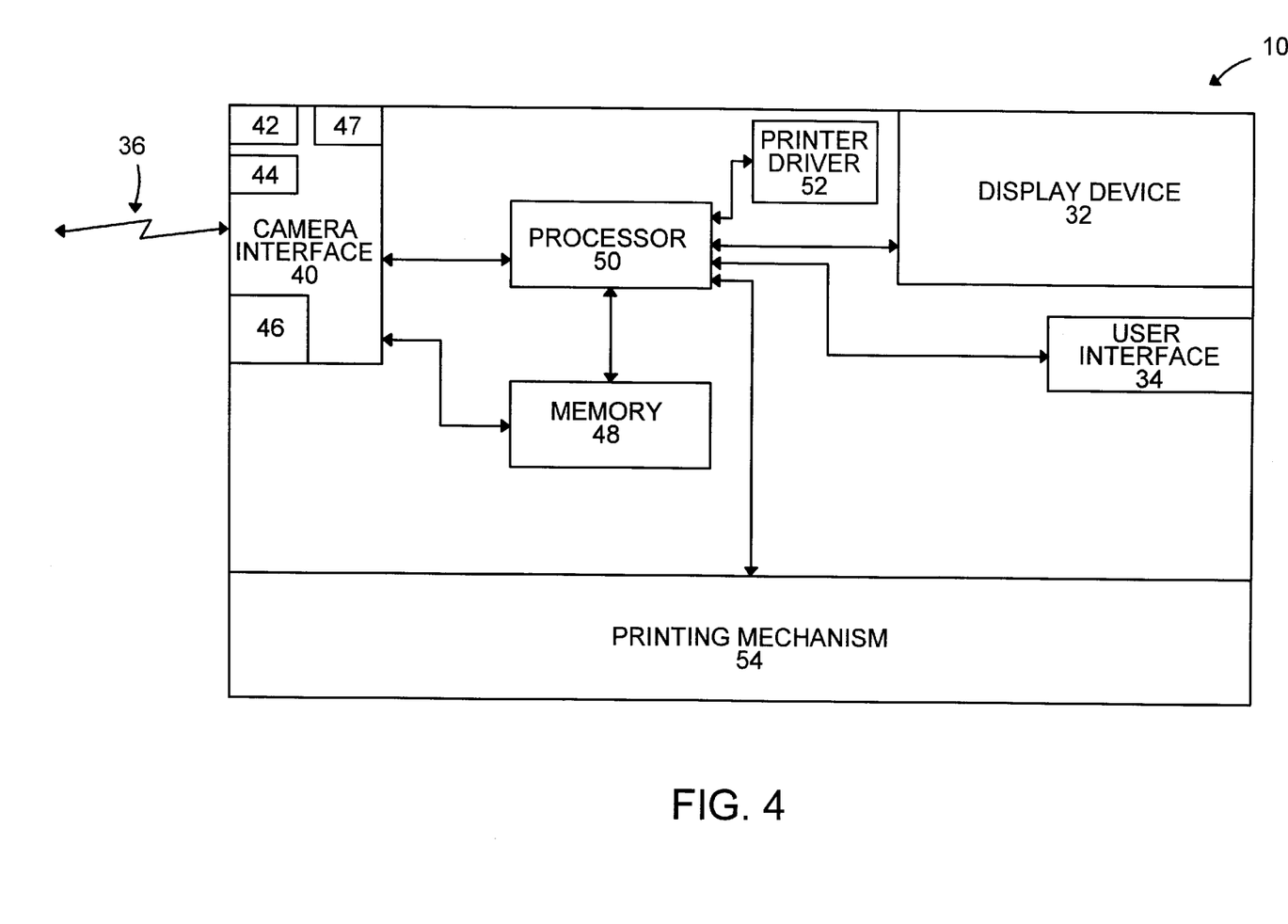
FIG. 4 is a block diagram of the components of the digital camera-ready printer in accordance with the present invention.

Turning now to FIG. 4, a block diagram of the components of the digital camera-ready printer 10 is shown. When applicable, same reference numerals are used for the same components illustrated in FIGS. 2 and 3. A communication link 36 is operatively connected to a camera interface 40. The communication link 36 represents the three types of links described above that are possible for transferring frames of digital image data to the digital camera-ready printer 10 from any conventional digital camera. The camera interface 40 can include a cable port 42, a memory card port 44, a cableless port 46, and a hot shoe port 47. Depending on the type of link that is utilized for transferring the frames of digital image data, one of the three ports 42, 44, 46, and 47 receives the frames of digital image data.

The camera interface 40 is coupled to memory 48 for storing the frames of digital image data. The memory 48 can be a conventional dynamic random access memory. The memory 48 may have a capacity of ten or more megabytes for storing dozens of electronic images represented by the frames of digital image data. However, the capacity of the memory 48 is not crucial to the invention as long as at least one image can be stored for displaying, editing and/or printing.

A processor 50 is shown which is operatively connected to all other components of the digital camera-ready printer 10, including the memory 48. The processor 50 is connected to the display device 32, the user interface 34, a printer driver 52, and a printing mechanism 54. The processor 50 receives the digital image data from the camera interface 40. The processor 50 can be configured to convert the frames of digital image data into a particular file format, such as JPEG. If JPEG is utilized, the processor 50 will convert all digital image data not in JPEG format received by the camera interface 40 into JPEG format for displaying, editing and/or printing. Other image file formats that can be utilized by the digital camera-ready printer 10 include TIFF, GIF, BMP, and FlashPix formats.

As stated above in reference to FIG. 3, the display device 32 can be an LCD, preferably, a color LCD. In one embodiment, the display device 32 displays one image at a time for editing and printing. In another embodiment, the display device 32 includes a feature to display numerous images in a thumbnail image format. The advantage of such a feature is that the user is able to view a number of images and select a particular image of interest for displaying, editing, and/or printing.

During the printing operation of the digital camera-ready printer, the printer driver 52 converts a selected frame of digital image data to be printed into print data in order to drive the printing mechanism 54 for printing the selected image onto a recording medium. The recording medium can be an ordinary paper, an inkjet paper, or a photographic paper. Photographic paper is a special paper with a glossy finish. An example of such paper is the HP Glossy Photographic Paper.

The printing mechanism 54 may be a dot-matrix printing mechanism, an inkjet printing mechanism, or a laserjet printing mechanism. Although the laserjet printing mechanism is superior to the inkjet mechanism in respect to speed and quality, the cost-efficient inkjet printing mechanism is preferred to lower the cost to manufacture the digital camera-ready printer 10.

Printing using inkjet technology is well known in the arts and will only be briefly discussed herein. For general color inkjet printing, an inkjet cartridge is utilized that typically contains four jets connected to four ink reservoirs. Each reservoir contains either cyan, magenta, yellow, or black ink. However, photo quality inkjet printing may include more color inks. For example, the cyan and magenta inks can each be divided into separate light and dark inks. The effect is to yield a more realistic photo picture. In operation, the inkjet cartridge moves horizontally along the recording medium and sequentially deposits ink, a dot at a time, onto the recording medium.

In the preferred embodiment, the resolution of the printing mechanism 54 is of photographic quality with 600 dots-per-inch (dpi) or greater. However, the resolution is not crucial to the invention.

In operation, the digital camera-ready printer 10 is linked to any digital camera by the communication link 36. The communication link 36 may involve exchanging a memory card, a cable connection, a cableless connection, or a hot shoe connection. If a memory card is utilized, the memory card is detached from the digital camera and inserted into the memory card port 44. After the memory card has been inserted, frames of digital image data stored in the memory card can be transferred and stored in the memory 48. In the preferred embodiment, the memory card can function as an addition memory of the digital camera-ready printer 10 such that the image data does not have to be transferred to the memory 48.

In a situation where the cable, cableless, or hot shoe connection is utilized, the frames are downloaded through the cable port 42 or the cableless port 46. If the digital camera has a feature enabling the digital camera to transmit the frame of digital image data without any instruction from the receiving device, i.e. the digital camera-ready printer 10, the image data is transferred to the digital camera-ready printer 10 without any intervention from the digital camera-ready printer 10. On the other hand, if the digital camera does not have such feature, the digital camera-ready printer 10 will initiate a signal instructing the digital camera to transmit the frames of digital image data. Preferably, the digital camera-ready printer 10 can be configured to identify and interface with any digital camera on the market. The configuration of the digital camera-ready printer 10 can be achieved by use of a computer software that allows the digital camera-ready printer 10 to identify the digital camera that is coupled to the digital camera-ready printer 10. In the preferred embodiment, the digital camera-ready printer 10 includes a floppy disk drive (not shown) to download the appropriate computer software required to interface with any digital camera. The frames of digital image data received through the cable port 42 or the cableless port 46 are transferred and stored in the memory 48.

After the frames of digital image data have been stored in the memory 48 or the memory card has been inserted into the memory card port 44, a user can input a command on the user interface 34 to view a frame of digital image data. In the preferred embodiment, the user can direct the digital camera-ready printer 10 to display a number of thumbnail images on the display device 32 in order for the user to select a particular image. The command by the user will initiate the processor 50 to read one frame of digital image data for a single image display or numerous frames of digital image data for a thumbnail display. Since the processor 50 needs to read frames of digital image data regardless of the file format, the processor 50 will convert all digital image data not in the predetermined file format, such as JPEG.

The displayed image on the display device 32 can be edited and manipulated by the user through the user interface 34. The editing and manipulating functions may include image cropping, image rotation, luminance manipulation, zoom factor adjustment, and color adjustment.

In order to print a selected image, the user inputs a print command on the user interface 34. The command prompts the processor 50 to operate in conjunction with the print driver 52 to convert the frame of digital image data representing the selected image to print data. The print data is supplied to the printing mechanism 54, where the printing mechanism 54 prints the selected image onto a recording medium. The digital camera-ready printer 10 is then ready to display and print another image. The method according to the present invention will be described with references to FIGS. 4 and 5. An image is captured as a frame of digital image data at step 510 by directing a digital camera at the images of interest and activating the capture function of the digital camera. The digital camera can be any one of a variety of digital cameras on the market. At step 520, the digital camera stores the frame of digital image data in a memory of the digital camera. Typically, the digital camera has an internal memory for storing the digital image data. If the digital camera utilizes a memory card system, the digital image data may be stored in a memory card instead of the internal memory. Steps 510 and 520 can be repeated to capture and store additional images.

Transmitting the digital image data from the camera to the digital camera-ready printer 10 is accomplished during step 530. As discussed in reference to FIG. 1, the means of transferring the digital image data can be implemented in various manners. If the communication link 18 is utilized, the digital image data is transferred through a cable. However, if the communication link 20 is utilized, the digital image data is transferred by detaching the memory card from the camera and physically inserting the memory card into the memory card port 44 shown in FIG. 2 of the digital camera-ready printer 10. If the communication link 22 is used, the digital image data is transferred through a cableless connection in the form of infrared or radio frequency waves. Lastly, if the communication link 23 is utilized, the digital image data is transferred through a hot shoe connection from the digital camera to the digital camera-ready printer 10. The camera interface 40 shown in FIG. 4 receives the transmitted digital image data either through the cable port 42, the memory card port 44, or the cableless port 46.

Figure 5:
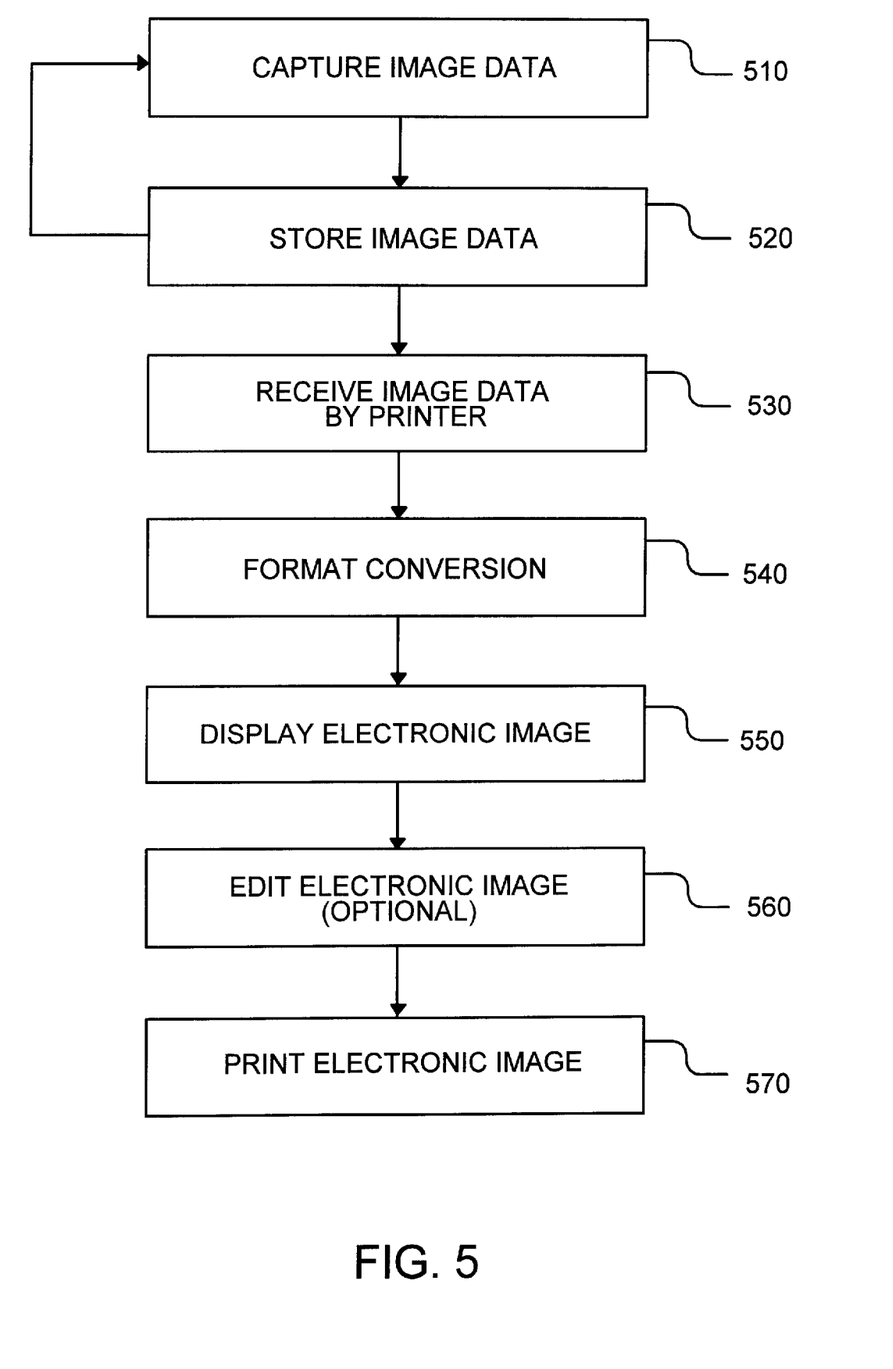
FIG. 5 is a flow diagram of a method of editing and printing an image that is captured by a digital camera without the use of a host computer in accordance with the present invention.

In a situation in which the cable, cableless, or hot shoe connection is utilized, the digital camera-ready printer 10 may need to communicate with the coupled digital camera to instruct the digital camera to transmit the digital image data. Preferably, the digital camera-ready printer 10 can be configured to identify and interface with any digital camera on the market. The instruction to the digital camera can be accomplished by sending a signal from the digital camera-ready printer 10, directing the digital camera to begin transmitting the stored digital image data.

At step 540, the digital image data is converted by the processor 50 to a predetermined image file format, such as JPEG, if the digital image data was stored in a different format. Displaying an electronic image represented by a selected frame of digital image data occurs at step 550. During an optional step 560, the user edits and manipulates the electronic image as desired. Finally at step 570, the digital camera-ready printer 10 prints the electronic image onto a recording medium.

What is claimed is:

1. An electronic imaging and printing system comprising:
 a printer housing;
 an input port configured to receive frames of digital image data from a variety of digital cameras, said frames being representative of images, said input port being attached to said printer housing;
 internal memory having an input connected to said input port to receive and store said frames of digital image data;
 processor means located within said printer housing for selectively editing and manipulating a selected frame of digital image data to provide an edited frame of digital image data, said processor means being enabled to execute a plurality of image modifications including at least two of image cropping, image rotation, luminance manipulation, zoom factor adjustment, and color adjustment;
 display means that is responsive to said processor means for visually displaying said edited frame of digital image data, said display means being connected to the exterior of said printer housing;

printer driver means that is responsive to said processor means for converting said edited frame of digital image data to print data; and printing means having a supply of print-forming material and being compatible with said printer driver means for printing an image in response to receiving said print data, said printing means being supported by said printer housing.

2. The electronic imaging and printing system of claim 1 further comprising means for selectively reconfiguring said processor means based upon a selection of a particular digital camera that is coupled to said frames of digital image data.

3. The electronic imaging and printing system of claim 2 further comprising means for inputting computer software to configure said processing means for compatibility with said variety of digital cameras from which said input port is capable of receiving said frames of digital image data.

4. The electronic imaging and printing system of claim 3 wherein said means for inputting said computer software is a floppy disk drive.

5. The electronic imaging and printing system of claim 1 further comprising a user interface that is manipulable to allow the execution of said plurality of image modifications.

6. The electronic imaging and printing system of claim 1 wherein said input port is a hot shoe receptor for receiving said frames of digital image data from any one of said variety of digital cameras having a hot shoe connector.

7. The electronic imaging and printing system of claim 1 further comprising a connector cable having a first end connected to said input port and a second end configured for connection to any one of said variety of digital cameras.

8. The electronic imaging and printing system of claim 1 wherein said input port is a cableless infrared or radio frequency port for receiving said frames of digital image data from any one of said variety of digital cameras with a cableless transmission capability.

9. The electronic imaging and printing system of claim 1 wherein said input port is a memory card port.

10. The electronic imaging and printing system of claim 1 wherein said display means includes a liquid crystal display.

11. An electronic imaging and printing system comprising:

a printer housing;

an input port attached to said printer housing and designed to receive frames of digital image data from a plurality of digital cameras, said frames being representative of images;

internal memory having an input connected to said input port to receive and store said frames of digital image data, said internal memory having stored programming for processing any of a plurality of different image file formats;

a digital signal processor coupled to said internal memory to process said frames of digital image data regardless of original image file format of said frames of digital image data, a display that is responsive to said digital signal processor to display said frames of digital image data, said display being connected to the exterior of said printer housing;

a printer driver associated with said digital signal processor to convert said frames of digital image data to print data; and a printing mechanism having a supply of print-forming material and being responsive to said print data to deposit said print-forming material onto a surface, said printing mechanism being supported by said printer housing.

12. The electronic imaging and printing system of claim 11 wherein said input port is a hot shoe receptor that is configured to be physically connected to any one of said plurality of digital cameras having a hot shoe connector for receiving said frames of digital image data.

13. The electronic imaging and printing system of claim 11 wherein said input port is a cableless infrared or radio frequency port that is compatible with receiving said frames of digital image data directly from any one of said plurality of digital cameras having a cableless transmitter.

14. The electronic imaging and printing system of claim 11 further comprising a floppy disk drive attached to said printer housing to input computer software in order to configure said digital signal processor to be compatible with said plurality of digital cameras from which said input port is capable of receiving said frames of digital image data.

15. The electronic imaging and printing system of claim 11 wherein said printing mechanism includes an inkjet cartridge having a supply of ink.

16. A method of editing and printing an image that is captured by any digital camera from a variety of digital cameras utilizing a digital camera-ready printer comprising the steps of:

receiving a frame of digital image data representing said image from said any digital camera by said digital camera-ready printer;

converting said frame of digital image data to a particular image file format within said digital camera-ready printer;

displaying an electronic image representative of said frame of digital image data on a display device located on said digital camera-ready printer;

editing and manipulating said electronic image by inputting commands via a user interface located on said digital camera-ready printer; and depositing print-forming material onto a surface utilizing said digital camera-ready printer to produce a printed image representative of said electronic image.

17. The method of claim 16 further comprising a step of internally identifying said any digital camera as a source of said frame of digital image data.

18. The method of claim 17 further comprising a step of sending a signal to said any digital camera instructing said any digital camera to transmit said frame of image data prior to said step of receiving said frame of digital image data.

19. The method of claim 16 further comprising a step of physically attaching said any digital camera to said digital camera-ready printer to form a hot shoe connection prior to said step of receiving said frames of digital image data.

20. The method of claim 16 further comprising a step of attaching a memory card that had previously been detached from said any digital camera to said digital camera-ready printer prior to said step of receiving said frame of digital image data.

21. The method of claim 16 wherein the step of receiving said frame of digital image data involves receiving said frame of digital image data in the form of an infrared or a radio frequency signal.

* * * * *

UNITED STATES PATENT AND TRADEMARK OFFICE
CERTIFICATE OF CORRECTION

PATENT NO. : 6,552,743 B1
DATED : April 22, 2003
INVENTOR(S) : Paul Rissman

Page 1 of 1

It is certified that error appears in the above-identified patent and that said Letters Patent is hereby corrected as shown below:

<u>Column 9,</u>
Line 55, delete "formats;" and insert therefor -- formats, while maintaining said frames as digital image data; --
Line 59, after "data," insert -- while maintaining said frames as digital image data; --

Signed and Sealed this

Twenty-eighth Day of December, 2004

JON W. DUDAS
*Director of the United States Patent and Trademark Office*